(12) United States Patent
Peled et al.

(10) Patent No.: US 9,012,104 B2
(45) Date of Patent: Apr. 21, 2015

(54) BIPOLAR PLATES AND REGENERATIVE FUEL CELL STACKS INCLUDING SAME

(75) Inventors: Emanuel Peled, Even Yehuda (IL); Arnon Blum, Mobile Post Shikmim (IL); Adi Aharon, Herzelia (IL); Yaron Konra, Ra'Anana (IL); Vladimir Zel, Haifa (IL); Kobby Saadi, Givaatime (IL)

(73) Assignee: Ramot At Tel-Aviv University Ltd. (IL)

( * ) Notice: Subject to any disclaimer, the term of this patent is extended or adjusted under 35 U.S.C. 154(b) by 0 days.

(21) Appl. No.: 13/574,930

(22) PCT Filed: Jan. 24, 2011

(86) PCT No.: PCT/IB2011/000097
§ 371 (c)(1),
(2), (4) Date: Jul. 24, 2012

(87) PCT Pub. No.: WO2011/089516
PCT Pub. Date: Jul. 28, 2011

(65) Prior Publication Data
US 2012/0308911 A1 Dec. 6, 2012

Related U.S. Application Data

(60) Provisional application No. 61/297,853, filed on Jan. 25, 2010.

(51) Int. Cl.
*H01M 8/02* (2006.01)
*H01M 4/96* (2006.01)
(Continued)

(52) U.S. Cl.
CPC .............. *H01M 4/96* (2013.01); *H01M 8/0258* (2013.01); *H01M 8/0271* (2013.01);
(Continued)

(58) Field of Classification Search
None
See application file for complete search history.

(56) References Cited

U.S. PATENT DOCUMENTS 6,447,943 B1   9/2002   Peled et al.
6,492,047 B1   12/2002  Peled et al.
(Continued)

FOREIGN PATENT DOCUMENTS

CN   1411618 A      4/2003
CN   101295798 A    10/2008
(Continued)

OTHER PUBLICATIONS

JP,2003-520412 (a raw machine translation) (Claims and Detailed Description)(Jul. 2, 2003).*
Li, et al., "Review of Bipolar Plates in PEM Fuel Cells: Flow-field Designs", International Journal of Hydrogen Energy, vol. 30. No. 4, Mar. 1, 2005, pp. 359-371.
(Continued)

*Primary Examiner* — Milton I Cano
*Assistant Examiner* — Carmen Lyles-Irving
(74) *Attorney, Agent, or Firm* — Ohlandt, Greeley, Ruggiero & Perle, L.L.P.

(57) ABSTRACT

A bipolar plate and regenerative fuel cell stacks including the bipolar plates and membrane electrode assemblies (MEAs) alternately stacked. The bipolar plate comprises a plate main body formed of an electrically conductive material. The plate main body has a first surface and a second surface opposite the first surface. Each surface has reaction flow channels through which fluids pass. The reaction flow channels on the first surface have a plurality of ribs therebetween forming an interdigitate flow field pattern. The reaction flow channels on the second surface have a plurality of ribs therebetween forming an interdigitate flow field pattern or a flow field pattern different from an interdigitate flow field pattern, e.g., a serpentine flow field pattern.

9 Claims, 11 Drawing Sheets

(51) Int. Cl.
  *H01M 4/90* (2006.01)
  *H01M 4/92* (2006.01)
  *H01M 8/18* (2006.01)

(52) U.S. Cl.
  CPC ......... *H01M 8/0202* (2013.01); *H01M 4/9083* (2013.01); *H01M 4/921* (2013.01); *H01M 4/926* (2013.01); *H01M 8/186* (2013.01); *Y02E 60/50* (2013.01)

(56) References Cited

U.S. PATENT DOCUMENTS

| | | | |
|---|---|---|---|
| 8,450,023 B2 * | 5/2013 | Conti et al. | 429/452 |
| 2006/0046125 A1 | 3/2006 | Lai | |
| 2006/0141326 A1 * | 6/2006 | Artibise et al. | 429/38 |
| 2008/0050639 A1 * | 2/2008 | Medina | 429/38 |
| 2009/0220835 A1 * | 9/2009 | Yushan et al. | 429/30 |

FOREIGN PATENT DOCUMENTS

| | | |
|---|---|---|
| EP | 1986259 A1 | 10/2008 |
| JP | 5524389 A | 2/1980 |
| JP | 02250269 | 10/1990 |
| JP | 11016591 | 1/1999 |
| JP | 2002246061 | 8/2002 |
| JP | 2003520412 A | 7/2003 |
| WO | 2010008449 A1 | 1/2010 |

OTHER PUBLICATIONS

International Search Report and Written Opinion dated Oct. 11, 2011 for corresponding International Patent Application No. PCT/IB2011/000097.

Written Opinion of the International Preliminary Examining Authority dated May 14, 2012 for corresponding International Patent Application No. PCT/IB2011/000097.

International Preliminary Report on Patentability dated Jun. 20, 2012 for corresponding International Patent Application No. PCT/IB2011/000097.

Australian Office Action dated Jun. 14, 2013 corresponding to Australian Patent Application 2011208458, 4 pp.

European Office Action dated Jul. 12, 2013 corresponding to European Patent Application 11 713 032.8-1360, 4 pp.

Peled, et al., "Hydrogen-Bromine Fuel Cells", Encyclopedia of Electrochemical Power Source, 2009, pp. 182-191, 11 pp.

Chinese Office Action dated Mar. 28, 2014 corresponding to Chinese Patent No. 201180007098.8, 10 pp.

Japanese Office Action dated Jul. 8, 2014 corresponding to Japanese Patent App. No. JP2012-549435, 8 pp.

Japanese Office Action dated Feb. 25, 2014 corresponding to Japanese Patent App. No. JP2012-549435 with English translation, 12 pp.

Canadian Office Action dated Oct. 18, 2013 corresponding to Canadian App. No. 2,787,467, 4 pp.

Chinese Office Action dated Dec. 17, 2014 corresponding to Chinese App. No. 20118007098.8, 19 pp.

* cited by examiner

BIPOLAR PLATES AND REGENERATIVE FUEL CELL STACKS INCLUDING SAME

CROSS-REFERENCE TO RELATED PATENT APPLICATIONS

This application is a 371 of International Patent Application No. PCT/IB2011/000097, filed Jan. 24, 2011, which claims priority to and the benefit of U.S. Provisional Patent Application Ser. No. 61/297,853, filed Jan. 25, 2010.

BACKGROUND

1. Field of the Disclosure

This disclosure relates to fluid distribution plates of a regeneration fuel cell stack assembly. More specifically, this disclosure relates to bipolar plates of a regeneration fuel cell stack assembly having various flow field designs and shunt current suppression channels. Furthermore, this disclosure relates to membrane electrode assemblies (MEAs) sandwiched between bipolar plates as part of regeneration fuel cell stack assemblies.

2. Discussion of the Background Art

A fuel cell stack assembly converts fuel including fluid reactants into an electric current. The fuel cell stack includes several repeated units of conductive fluid distribution plates and membrane electrode assemblies each sandwiched between two conductive fluid distribution plates. The conductive fluid distribution plates are called bipolar plates, and designed to distribute the fluid reactants evenly and smoothly across the fluid distribution plate. A flow field pattern of flow field channels inside the distribution plates that distribute the fluid reactants can be one of many kinds. The specific dimensions of the flow field channels, ribs forming the flow field channels and overall size of the flow field channels are a function of fluid properties, temperature, pressure and a rated power demand.

A pump may generate a flow of the fluid reactants through the flow field channels inside the fluid distribution plate. Reducing a flow rate of the fluid reactants in the flow field channels inside the distribution plate is advantageous since a circulation pump power rating of the pump is a straight function of the flow rate, and reducing a power consumption of the pump increases the efficiency of the overall process of electric current generation of the fuel cell stack assembly.

A shunt current generates a parasitic current loss in the fuel cell stack assembly. The shunt current results from electrolysis of an ionic solution at manifold supply channels that distribute fluid to the fluid distribution plates.

There is a need in the art for a flow field pattern that reduces a flow rate of the fluid reactants in the fluid distribution plate while maintaining or increasing a distribution of the fluid reactants. There is a further need for reducing a shunt current in a fuel cell stack assembly.

SUMMARY

This disclosure relates to a bipolar plate comprising a plate main body formed of an electrically conductive material. The plate main body has a first surface and a second surface opposite the first surface. Each surface has reaction flow channels through which fluids pass. The reaction flow channels on the first surface have a plurality of ribs therebetween forming an interdigitate flow field pattern. The reaction flow channels on the second surface have a plurality of ribs therebetween forming an interdigitate flow field pattern or a flow field pattern different from an interdigitate flow field pattern, e.g., a serpentine flow field pattern.

This disclosure also relates to a bipolar plate comprising a plate main body formed of an electrically conductive material. The plate main body has a first surface and a second surface opposite the first surface. Each surface has reaction flow channels through which fluids pass. Manifolds are formed on the plate main body in the form of an inlet to introduce a fluid to the reaction flow channels and an outlet to discharge the fluid from the reaction flow channels. Connection channels are formed on the plate main body to connect the reaction flow channels and the manifolds. The reaction flow channels on the first surface have a plurality of ribs therebetween forming an interdigitate flow field pattern. The reaction flow channels on the second surface have a plurality of ribs therebetween forming an interdigitate flow field pattern or a flow field pattern different from an interdigitate flow field pattern, e.g., a serpentine flow field pattern.

The connection channels have a length from the reaction flow channels to the manifolds sufficient to form an internal ionic solution resistor that reduces a shunt current.

With regard to the connection channels that are formed on the plate main body to connect the reaction flow channels and the manifolds, gaskets for sealing the bipolar plates are attached when the bipolar plates are stacked. The connection channels are formed such that flat regions of both the first surface and a second surface opposite the first surface of the plate main body face each other when the plate main bodies are stacked, and the gaskets are attached to the flat surfaces of the plate main bodies.

This disclosure further relates to a frame for a bipolar plate. The frame comprises a frame main body formed of an insulation material. The frame main body has a first surface and a second surface opposite the first surface. The frame main body has an aperture therethrough. Connection channels are formed in the frame main body to connect to reaction flow channels in the bipolar plate. The bipolar plate is positioned in the aperture. The bipolar plate is connected to the frame through the connection channels formed in the frame main body and reaction flow channels in the bipolar plate. The connection channels formed in the frame main body are connected to manifolds.

This disclosure yet further relates to a regenerative fuel cell stack comprising a plurality of membrane and electrode assemblies, and a plurality of bipolar plates. The plurality of bipolar plates comprise a plate main body formed of an electrically conductive material. The plate main body has a first surface and a second surface opposite the first surface. Each surface has reaction flow channels through which fluids pass. The reaction flow channels on the first surface have a plurality of ribs therebetween forming an interdigitate flow field pattern. The reaction flow channels on the second surface having a plurality of ribs therebetween forming an interdigitate flow field pattern or a flow field pattern different from an interdigitate flow field pattern, e.g., a serpentine flow field pattern. The plurality of membrane and electrode assemblies are alternately stacked with the plurality of bipolar plates.

This disclosure also relates to a regenerative fuel cell stack comprising a plurality of membrane and electrode assemblies, and a plurality of bipolar plates. The plurality of bipolar plates comprise a plate main body formed of an electrically conductive material. The plate main body has a first surface and a second surface opposite the first surface. Each surface has reaction flow channels through which fluids pass. Manifolds are formed on the plate main body in the form of an inlet to introduce a fluid to the reaction flow channels and an outlet to discharge the fluid from the reaction flow channels. Connection channels are formed on the plate main body to connect the reaction flow channels and the manifolds. The reaction flow channels on the first surface have a plurality of ribs therebetween forming an interdigitate flow field pattern. The reaction flow channels on the second surface have a plurality of ribs therebetween forming an interdigitate flow field pattern or a flow field pattern different from an interdigitate flow field pattern, e.g., a serpentine flow field pattern. The plurality of membrane and electrode assemblies are alternately stacked with the plurality of bipolar plates.

This disclosure further relates to a regenerative fuel cell stack comprising a plurality of bipolar plates, and a plurality of membrane and electrode assemblies. The plurality of membrane and electrode assemblies comprise an anode, a cathode and a solid electrolyte membrane disposed between said anode and said cathode. The anode comprises a support and a catalyst dispersed thereon, wherein the catalyst comprises at least one precious metal. The cathode comprises a support and a catalyst optionally dispersed thereon, wherein the catalyst comprises carbon powder or at least one precious metal with carbon powder. The catalyst dispersed on the anode and the catalyst dispersed on the cathode are the same or different and are capable of catalyzing, in the presence of a halogen ion or a mixture of halogen ions, a charging reaction and a discharging reaction in a regenerative fuel cell. The plurality of membrane and electrode assemblies are alternately stacked with the plurality of bipolar plates.

Further objects, features and advantages of the present disclosure will be understood by reference to the following drawings and detailed description.

DETAILED DESCRIPTION OF THE PREFERRED EMBODIMENT

Figure 1:
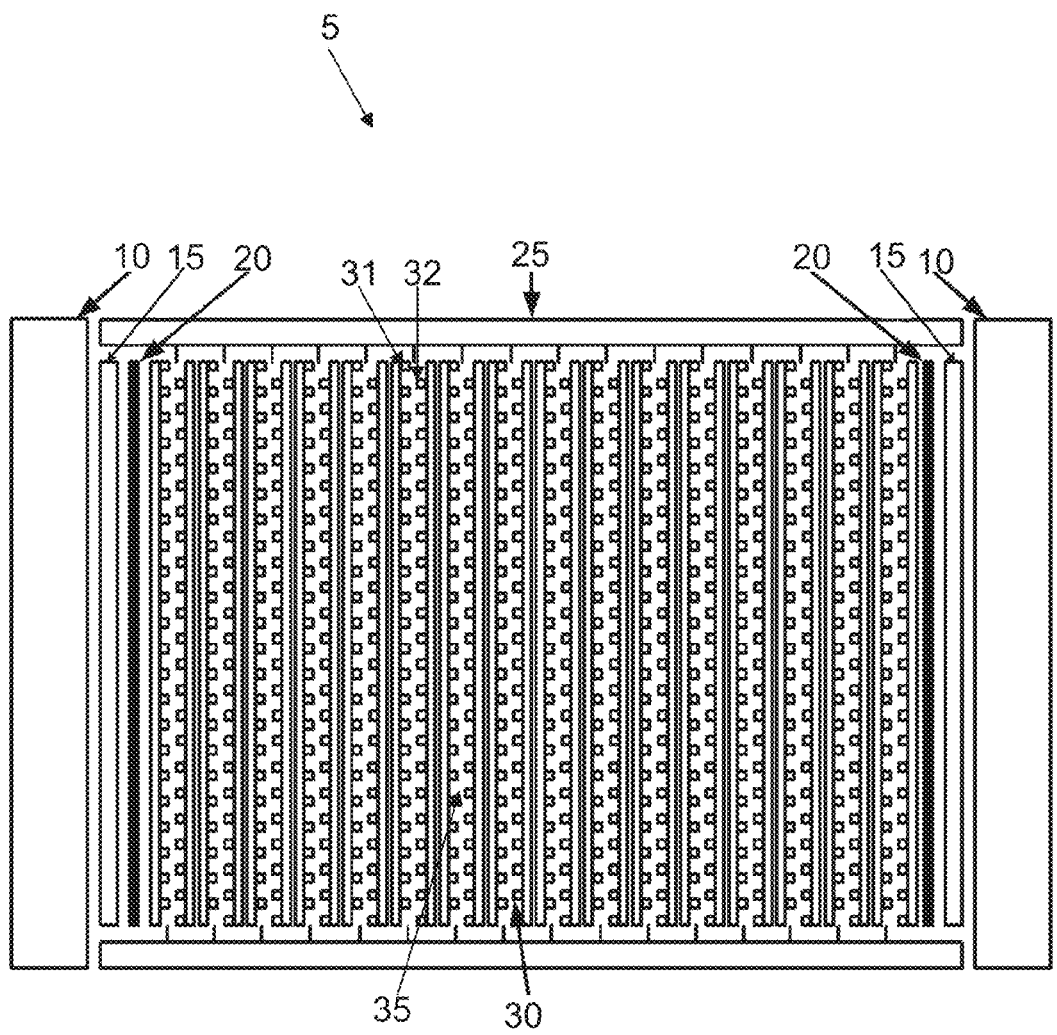
FIG. 1 is a cross section view of a fuel cell stack and its components according to the present disclosure.

A bipolar plate of this disclosure is formed of an electrically conductive material. The bipolar plate has a first side and a second side opposite the first side.

The first side of the bipolar plate has a first fluid channel disposed in, molded into or formed in the electrically conductive material to guide fluid through the bipolar plate of the regeneration fuel cell stack assembly. The first fluid channel has an inlet port in fluid communication with an inlet channel and an outlet channel in fluid communication with an outlet port. The inlet and outlet channels have a plurality of ribs disposed therebetween forming an interdigitate flow field pattern.

The second side of the bipolar plate has a second fluid channel disposed in, molded into or formed in the electrically conductive material to guide fluid through the bipolar plate of the regeneration fuel cell stack assembly. The second fluid channel preferably has a second inlet port in fluid communication with a second inlet channel and a second outlet channel in fluid communication with a second outlet port, and the second inlet and second outlet channels preferably have a plurality of ribs disposed therebetween forming a second interdigitate flow field pattern. The second fluid channel has a second inlet port of a second inlet channel connected to a second outlet channel having a second outlet port, and the second inlet and second outlet channels preferably have a plurality of ribs disposed therebetween forming a serpentine flow field pattern. The interdigitate flow field pattern can reduce a required flow rate of a reactant by about 10 percent to about 50 percent compared to other patterns.

In an embodiment, the first fluid channel is connected to a groove formed in the first side of the electrically conductive material. The groove has an insulation material therein forming a connection channel having a first and second end, wherein the first end is connected to the first fluid channel and the second end is connected to a manifold that distributes the fluid to the first fluid channel.

The connection channel preferably has a length or distance from the manifold to the first fluid channel which is sufficient to form an internal ionic solution resistor that reduces a shunt current. The connection channel is preferably open, thereby forming an opening in the first side. The opening of the first fluid channel is preferably covered by an insulation layer. The insulation layer electronically separates a second distribution plate from the first distribution plate. The insulation layer also typically has an insulation layer opening so that at least a portion of the first fluid channel is uncovered by the insulation layer.

The bipolar plate of this disclosure can include a frame formed of an insulation material. The frame has a first frame side and a second frame side opposite the first frame side. The first frame side has a connection channel formed in the insulation material to connect to a manifold that distributes a fluid. The frame has a frame aperture therethrough surrounded by the insulation material.

The insulation material can be a non-conductive polymer. The frame may be connected to a bipolar plate, and wherein the bipolar plate is positioned in the frame aperture. The frame can be connected to an o-ring on the first side. The bipolar plate may be formed of an electrically conductive material having a first side and a second side opposite the first side, and where the frame surrounds a portion of the first side and the second side at a perimeter of the bipolar plate connecting the frame and the bipolar plate.

Fuel Cell Stack

Referring to FIG. 1, a cross section view of a fuel cell stack assembly 5 is shown. Fuel cell stack assembly 5 includes: fix plates 10, insulation plates 15, current collectors 20, an insulated fluid distribution manifold 25, bipolar plates or bipolar plates (BPP plates) 30, membrane electrode assemblies (MEA) 35, and sealants 36. Power generated by fuel cell stack assembly 5 is determined by a number of cells integrated in the fuel cell stack, each cell including one of MEA plates 35 between two of BPP plates 30, and their physical active area.

BPP plates 30 guide liquids and/or gasses inside fuel cell stack assembly 5. Each of BPP plates 30 has a first side 31 and a second side 32. The BPP plates 30 are channeled plates each having one or more channels. The one or more channels have a shape of flow field pattern. The first side 31 may have a channel directing flow of a gas while and second side 32 directs flow of liquid. Each of BPP plates 30 is made of electrically conductive material such as, for example, metal or composite graphite. The material of BPP plates 30 is chemically inert to fluid directed therein. Operational size of BPP plates 30 can vary from about 5 square centimeters to about 1000 square centimeters ($cm^2$), preferably in a range of about 100 square centimeters to about 750 square centimeters, and more preferably of about 500 square centimeters to about 530 square centimeters.

The fix plates 10 hold an entire structure of fuel cell stack assembly 5 in a fixed position. The insulation plates 15 separate each of fix plates 10 from current collectors 20. The current collectors 20 are a linking point for power input/output of fuel cell stack assembly 5.

Fluid flows into insulated fluid distribution manifold 25. Insulated fluid distribution manifold 25 directs the fluid into each BPP plates 30 connected in series. The cells inside fuel cell stack assembly 5 are typically combined in series to reach a specific voltage output. Once passing through each cell connected in series, the fluid then flows out through an opposite side of insulated fluid distribution manifold 25. There are two insulated fluid distribution manifolds 25 on each side of BPP 30, their role is to cause fluid to flow from the same side of a single BPP.

Figure 2:
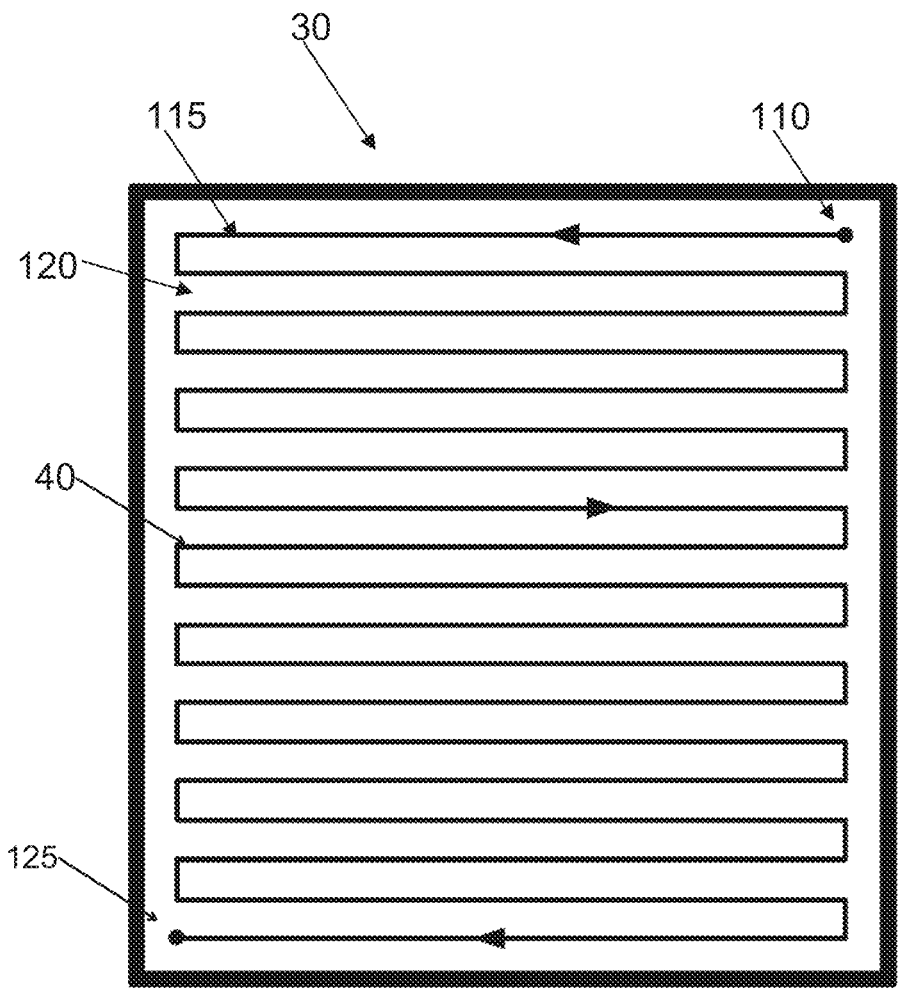
FIG. 2 illustrates a bipolar plate having a serpentine flow field pattern according to the present disclosure.

Referring now to FIG. 2, one of BPP plates 30 that has a serpentine flow field pattern is shown. The BPP plate 30 has a channel 40. The BPP plate 30 has one inlet port 110, one channel 115 for fluid transport, a plurality of ribs 120, and an outlet port 125. The plurality of ribs 120 form channel 115 therebetween. Fluid enters channel 115 through inlet port 110 and exits channel 115 through outlet port 125. The serpentine flow field pattern in the present disclosure may be used for a hydrogen gas side of a cell of fuel cell stack assembly 5 where the fluid that flows through channel 115 is hydrogen gas.

Figure 3:
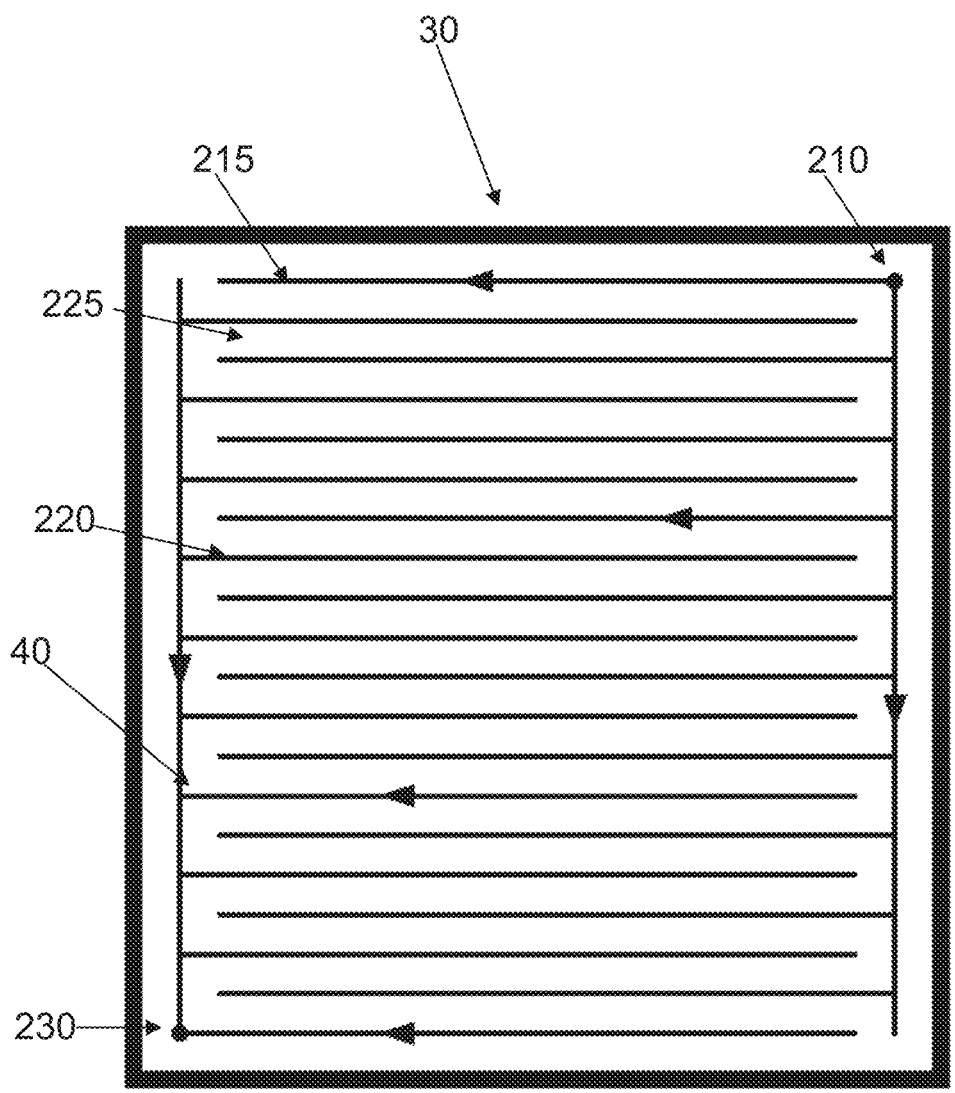
FIG. 3 illustrates a bipolar plate having an interdigitate flow field pattern according to the present disclosure.

Referring now to FIG. 3, one of BPP plates 30 that has an interdigitate flow field pattern is shown. The BPP plate 30 has a channel 40. The BPP plate 30 has an inlet port 210, an inlet channel 215, an outlet channel 220, a plurality of ribs 225, and an outlet port 230. Fluid enters inlet port 210 and fills inlet channels 215 completely. Since firm ribs 225 separate inlet channels 215 from outlet channels 220, the fluid must flow on top of the rib, where porous MEA 35 electrode is situated, before rejoining outlet channels 220 and exiting through outlet port 230. The interdigitate flow field pattern may be used for a liquid side of one of BPP plates 30.

Each of BPP plates 30 may have channel 40, for example, having a serpentine flow field pattern or an interdigitate flow field pattern, stamped in the material forming the BPP plate. It is desirable to have an even flow of reactants to each cell of fuel cell stack assembly 5 from insulated fluid distribution manifold 25 with even distribution across the cell in channel 40 of BPP plates 30 so that an even current density and voltage distribution across the cell and between cells will be achieved.

It has been found by the present disclosure that the interdigitate flow field pattern as shown in FIG. 3 has significantly better performance on a liquid side of each of BPP plates 30 than other flow fields, for example, the serpentine flow field pattern as shown in FIG. 2. Distribution is enhanced of reactant in liquid media flowing through inlet channel 215 and outlet channel 220 of each of BPP plates 30 in the interdigitate flow field pattern that allows a flow rate of the liquid media in the interdigitate flow field pattern to be reduced, while maintaining or exceeding performance of the cell. Reducing the flow rate of the liquid media is advantageous since a circulation pump power rating is a straight function of the flow rate, and by reducing power consumption, the efficiency of the overall process of fuel cell stack assembly 5 increased.

Shunt Current

Referring back to FIG. 1, a shunt current generates a parasitic current loss in fuel cell stack assemblies similar to fuel cell stack assembly 5. The shunt current results from electrolysis of fluid, for example, an ionic solution, at manifold supply channels that distribute fluid to BPP plates 30. As shown in FIGS. 6-10, to reduce the shunt current, connection channels or shunt current suppression channels (SCSC) 315 are added. By increasing a path of which the ionic solution has to go through from insulated fluid distribution manifold 25 to channel 40 of each of BPP plates 30, an internal ionic solution resistor is formed. The length and the cross section area of SCSC 315 are determined by: a potential across insulated fluid distribution manifold 25, conductivity of the ionic solution and maximum allowed shunt currents.

For fuel cell stack assemblies 5 that incorporate ion transfer liquids such as, for example, solution of salt or acid/base water solution, insulated channels must be used to direct the reactants of the ion transfer liquids into and out of a bipolar plate flow field of BPP plates 30 to avoid a shunt current phenomenon. High voltage is yet another limit to a size of fuel cell stack assembly 5, as shunt current phenomenon increase with the stack voltage. The overall voltage of fuel cell stack assembly 5 is determined by the number of BPP 30 connected in series, and the voltage that each BPP 30 generates. Taking, for example, a fuel cell stack 5 with 125 BPP 30 stacks in series, with 1 volt generated by each BPP 30, the overall stack voltage would be 125 volts.

The present disclosure describes two methods to reduce the shunt current on the insulated fluid distribution manifold 25 level and BPP plates 30 level. The two methods involve integrated or embedded SCSC 315 in one or more of BPP plates 30, and framed or over molded SCSC 315 in one or more of BPP plates 30.

The SCSC 315 may be designed to maintain a shunt current level for about 125 cells at below about 1% (about 125 Volts).

Integrated or Embedded SCSC

Figure 6:
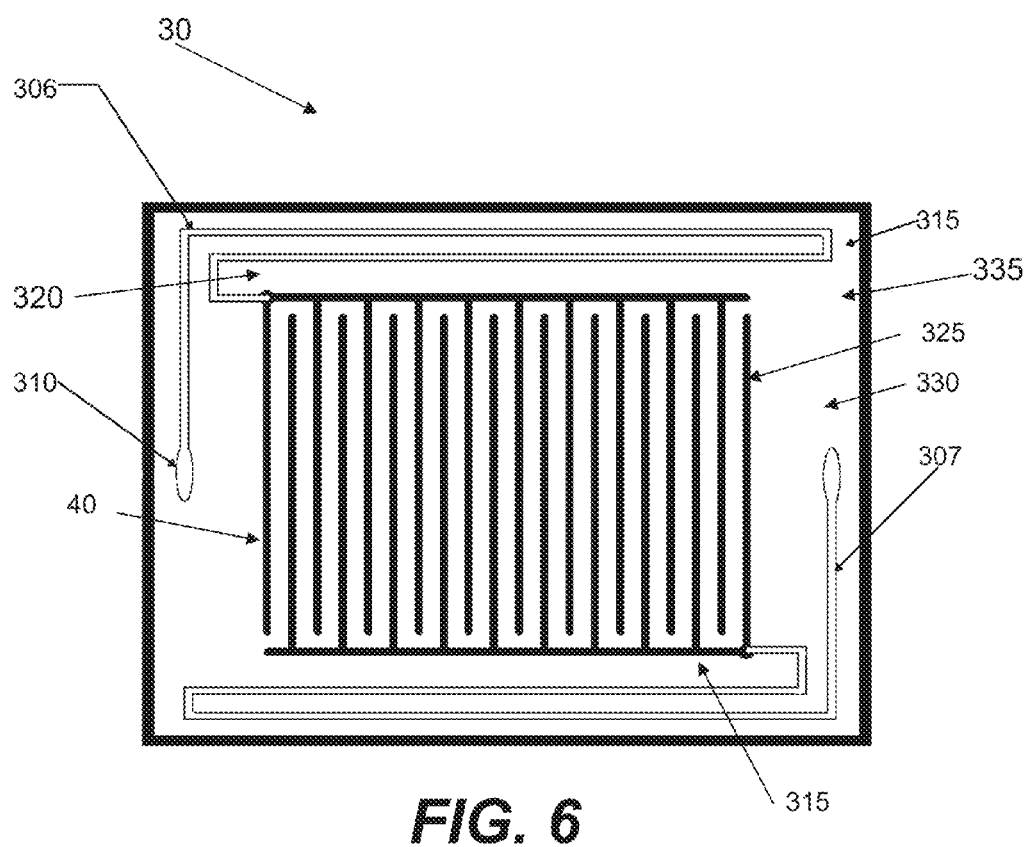
FIG. 6 illustrates a bipolar plate having connection channels imbedded therein.

Referring now to FIG. 6, one of BPP plates 30 having SCSC 315 is shown. A first connection channel 306 of SCSC 315 is connected to an inlet 310 to insulated fluid distribution manifold 25. A second connection channel 307 of SCSC 315 is connected to an outlet 330 to insulated fluid distribution manifold 25. A fluid, such as, for example, solution of salt or acid/base water solution, flows from connection channel 306 directly to channel 40 of one of BPP plates 30. The fluid flows from channel 40 directly to second connection channel 307 to outlet 330. The connection channel 306 connects to inlet channel 320 and connection channel 307 connects to outlet channel 325 of an interdigitate flow field pattern of channel 40.

Figure 7:
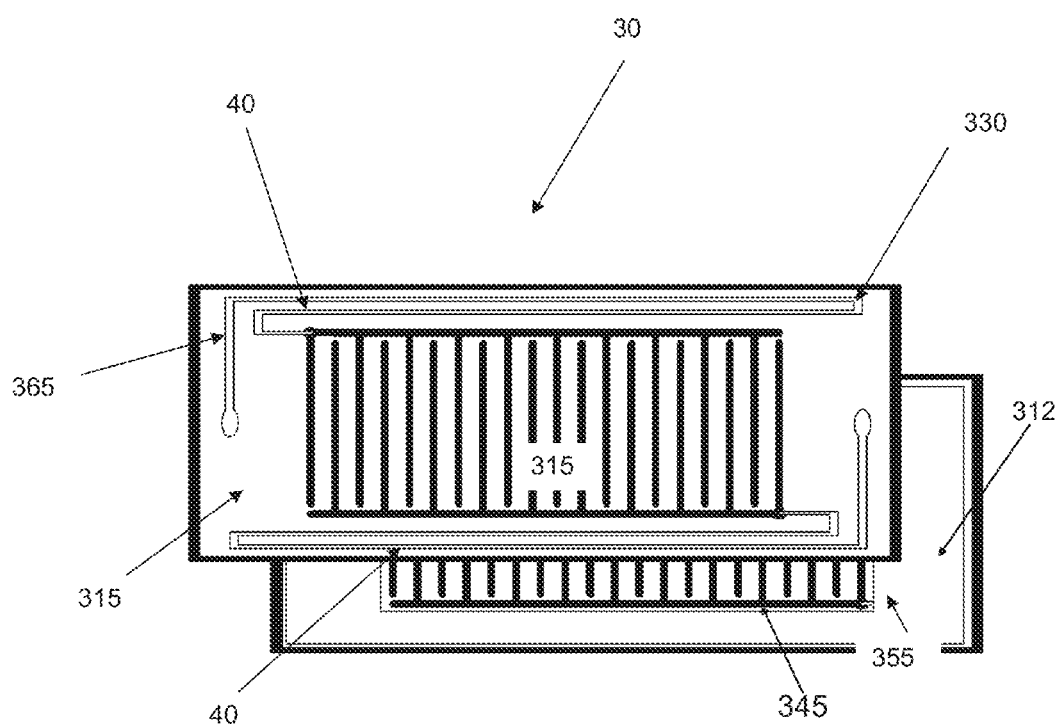
FIG. 7 illustrates a pair of bipolar plates of FIG. 6 having an insulation layer therebetween.
Figure 8:
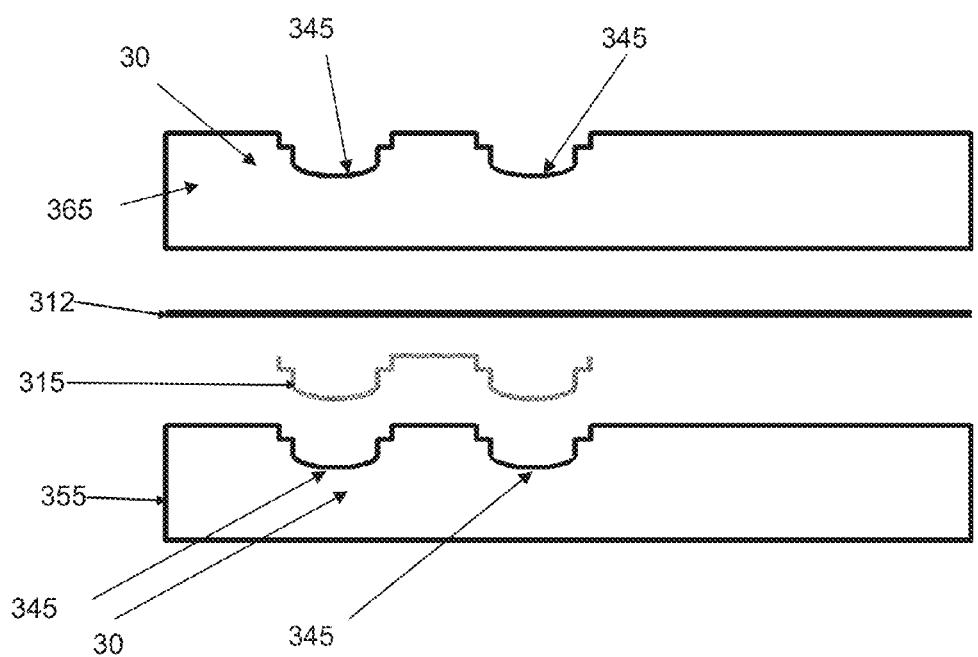
FIG. 8 is cross sectional view of a pair of bipolar plates having an insulation layer and an insert therebetween of FIG. 7.

Referring now to FIGS. 7 and 8, SCSC 315 are made of insulated material such as, for example, polyvinylidene fluoride (PVDF) or polytetrafuoroethylene (PTFE). Conduits of insulated fluid distribution manifold 25 that distributes the fluid to SCSC 315 may also be made of insulated material such as, for example, polyvinylidene fluoride (PVDF) or polytetrafuoroethylene (PTFE). Conduits of insulated fluid distribution manifold 25 may be insulated by flat sealants and/or PVDF inserts. As shown in FIG. 8, SCSC 315 may be an insert, for example, a machined fitting, of insulated material that sits inside one or more grooves 345 in BPP plates 30. The insulated material may also reduce or eliminate corrosion of the material of BPP plate 30, such as, for example, graphite. The SCSC 315 are opened at a top, and sealed by a flat gasket 312. As shown in FIG. 7, flat gasket 312 also electronically separates a first BPP plate 355 of BPP plates 30 from an adjacent second BPP plate 365 of BPP plates 30. FIG. 8 shows a cross section of a grooved first bipolar plate 355 of BPP plates 30, a SCSC 315 sits inside grooves 345, gasket 312 seals SCSC 315 and electronically separates first BPP plate 355 from second BPP plate 365.

First connection channel 306 and second connection channel 307 are easy and may be precisely assembled. First connection channel 306 serves as an insulated separation to inlet 310 from channel 40 and second connection channel 307 serves as an insulated separation to outlet 330 from channel 40, which renders use of complex insulated piping unnecessary. In addition, use of gasket 312 that is flat for both sealing and electrical insulation is simplicity of this technology.

Framed or Over Molded SCSC

Figure 9:
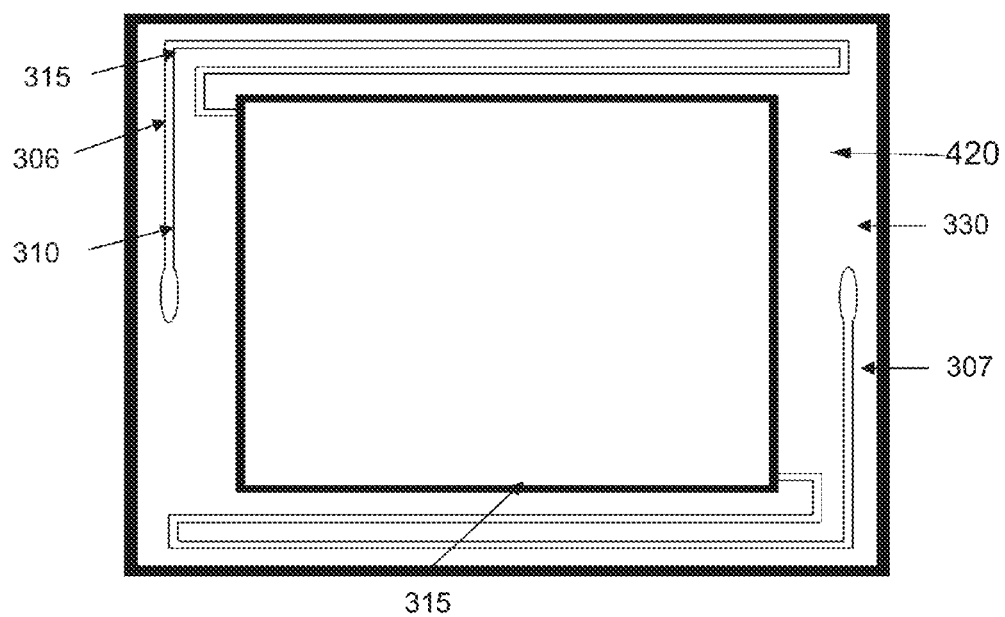
FIG. 9 illustrates a frame having connection channels molded within the frame.

Referring now to FIG. 9, an example of SCSC 315 formed in a frame 420 is shown. Inlet 310 and outlet 330 to insulated fluid distribution manifold 25 that distributes the fluid to SCSC 315 may also be formed in frame 420. Frame 420 that includes SCSC 315 and inlet 310 and outlet 330 to insulated fluid distribution manifold 25 that distributes the fluid to SCSC 315 may also be made of insulated material such as, for example, polyvinylidene fluoride (PVDF) or polytetrafuoroethylene (PTFE) (or a mixture of carbon and polymer with very low electronic conductivity). The frame 420 is separate from BPP plates 30. The frame 420 is over molded at the same time or later than one of BPP plates 30.

Figure 10:
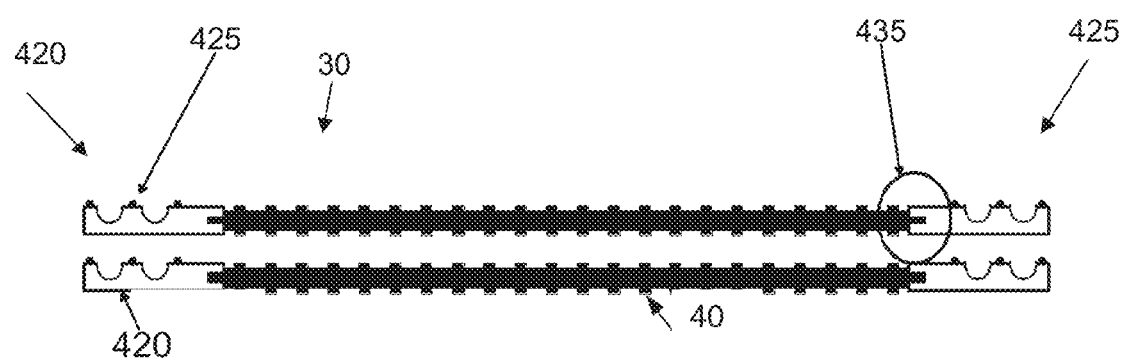
FIG. 10 shows a cross sectional view a pair of bipolar plates each in the frame of FIG. 9 having O-ring sealants therebetween.

Referring now to FIG. 10, BPP plates 30 including frame 420 have an area that is smaller than BPP plates without frame 420. BPP plates 30 including frame 420 have channel 40 with an end connecting to frame 420. BPP plates 30 including frame 420 have channel 40 with an end connecting to frame 420 so that fluid may flow between SCSC 315 and channel 40. FIG. 10 shows a cross section of over-molded frame 420, over one of BPP plates 30. BPP plate 30 and frame 420 are sealed in a type of fussed over molding, or any other method, for example, where o-ring 425 is situated between BPP 30 and frame 420. A designed tip 435 at the perimeter of each of BPP plates 30 attaches frame 420 to each of the bipolar plates. This technology reduces the area of BPP plates 30 that is a more expensive material, for example, composite graphite, than the insulation material, for example, PVDF, of frame 420 decreasing cost of fuel cell stack assembly 5 including one or more frames 420.

Each of BPP plates 30 connected to frame 420 avoid production of complex insulated inserts. Frame 420 that is over molded to one of BPP plates 30 helps to reduce an overall thickness of the BPP plate that is made of, for example, graphite, since there are no special grooves, a backing thickness is not required in the graphite plate. In addition, insulated fluid distribution manifold 25 is insulated from BPP plates 30 in a stack level and no separate insulated channels are required. Another benefit is safety, since the over-mold material of frame 420, BPP plates 30 that may be graphite plates are insulated as a core cell from an outer environment, and high voltage hazardous is reduced.

Dual Stack Design

Figure 11:
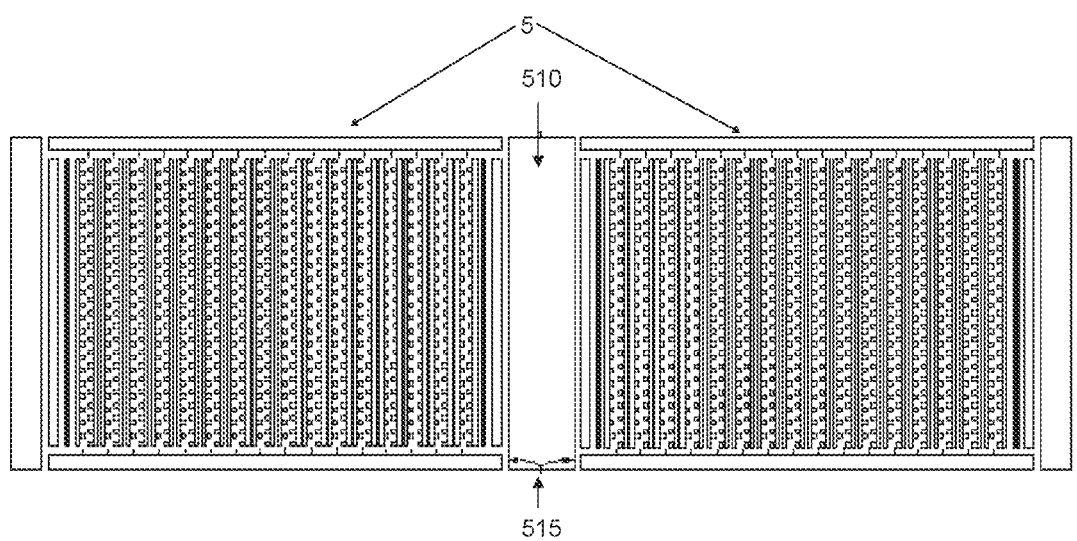
FIG. 11 illustrates a dual fuel cell stack assembly of the present disclosure.

A dual stack design in the present disclosure refers to FIG. 11. It has a center manifold plate 510, which divides an inlet flow 515 into two identical flows. The reactants of inlet flow 515 run along two identical fuel cell stacks assemblies 5, on either side of center manifold plate 510. The dual stack design increases a power output of fuel cell stacks assembly 5, without changing the dimensions of SCSC 315 inside the BPP plates 30. The dual stack increases the unit output power by electrically connecting the outputs of each right and left hand side in parallel, without changing dimensions of SCSC 315. The dimensions of SCSC 315, as described before, has a linear relationship with the stack output voltage. The use of dual stack concept, enables one to enlarge the output power without changing the output voltage.

Therefore, the present disclosure provides BPP plates 30 with different patterns of flow field on each side of the BPP plates. In addition, a method for creating SCSC 315 is addressed, both on the plate level and on the stack level. The shunt current loss is further reduced by limiting a voltage output of fuel cell stack assembly 5 without reducing its power rating.

The present disclosure provides BPP plates 30 that are able to endure highly corrosive environment. The flow field patterns are chosen and designed to meet the demands of flow rate, pressure loss and even distribution across the BPP plates 30. In addition, a design of BPP plates 30 having embedded or over-molded SCSC 315 in the plate level and the stack level is provided. Another problem is solved on the stack level, as BPP plates 30 are connected in both parallel and series to lower the overall voltage and limit further a shunt current loss. This is done by using a two-sided insulated distribution plate 510, which divides the reactant inlets for two parallel sides. The dividing of the reactant to two is not affecting the overall power generated by the stack.

It should also be recognized that the terms "first", "second", "third", "upper", "lower", and the like may be used herein to modify various elements. These modifiers do not imply a spatial, sequential, or hierarchical order to the modified elements unless specifically stated.

Membrane and Electrode Assemblies (MEAs)

In use, the MEA is typically sandwiched between two rigid plates, known as distribution plates, also known as bipolar plates (BPPs). The distribution plate is electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated as a flow field. The distribution plate may distribute fluids to and from two consecutive MEAs in a stack, with one face directing fuel to the anode of the first MEA while the other face directs oxidant to the cathode of the next MEA, hence the term "bipolar plate". Alternately, the distribution plate may have channels on one side only, to distribute fluids to or from an MEA on only that side, which may be termed a monopolar plate. A typical fuel cell stack comprises a number of MEAs stacked alternately with bipolar plates.

This disclosure provides a membrane electrode assembly (MEA) that comprises an anode, a cathode and a solid electrolyte membrane disposed between the anode and the cathode. The anode comprises a support and a catalyst dispersed thereon, wherein the catalyst comprises at least one precious metal. The cathode comprises a support and a carbon powder or catalyst dispersed with or on a carbon powder, wherein the catalyst comprises at least one precious metal or carbon powder. The catalyst dispersed on the anode and the catalyst dispersed on the cathode are the same or different and are capable of catalyzing, in the presence of a halogen ion or a mixture of halogen ions, a charging reaction and a discharging reaction in a regenerative fuel cell, e.g., a hydrogen/bromine regenerative fuel cell.

In the MEA, the catalyst dispersed on the anode and the catalyst dispersed on the cathode are capable of catalyzing hydrogen redox reactions and halogen/halide redox reactions. Also, in the MEA, the catalyst dispersed on the anode and the catalyst dispersed on the cathode are capable of catalyzing a charging reaction and a discharging reaction in a regenerative fuel cell in the presence of a halogen ion or a mixture of halogen ions.

In the MEA, a preferred solid electrolyte membrane is a proton conducting membrane having pores with a diameter size which is essentially smaller than 30 nm. The solid proton conducting membrane comprises: (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and said fuel; and (iii) 10 to 90% by volume of an acid or aqueous acid solution.

The solid proton conducting membranes useful in the fuel cells of this disclosure are described in U.S. Pat. Nos. 6,447,943 and 6,492,047, which are incorporated herein in their entirety by reference thereto. The polymeric binders used in these membranes are selected from the group consisting of: poly(vinylidenfluoride), poly(vinylidenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), Kel F™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

The proton conducting membranes useful in the fuel cells of this disclosure also comprise an acid or aqueous acid solution. As opposed to the solid electrolyte membrane described, for example, in U.S. Pat. No. 5,599,638, which is incorporated herein by reference thereto in its entirety, wherein no acid is present in free form, the solid electrolyte membrane discussed here, when used in the fuel cells, contains free acid molecules entrapped in the pores of the membrane. Alternatively, it may contain acid molecules bonded to the inorganic powder. The typical diameter of these pores is essentially smaller than 30 nm, preferably smaller than 20 nm, and more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzene, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, Nafion™ ionomers, HCl, HBr, phosphoric acid, sulfuric acid, and mixtures thereof.

Alternatively, the solid electrolyte membrane is a proton conducting membrane (PCM) comprising pores with a typical diameter size which is essentially smaller than 50 nm, preferably smaller than 3 nm, and more preferably smaller than 1.5 nm.

A further membrane according to the present disclosure is film made of a proton conducting matrix as described in U.S. Pat. No. 6,811,911, which is incorporated herein in its entirety by reference thereto. The ion conducting matrix comprises: (i) 5% to 60% by volume of an inorganic powder having a good aqueous electrolyte absorption capacity; (ii) 5% to 50% by volume of a polymeric binder that is chemically compatible with an aqueous electrolyte; and (iii) 10 to 90% by volume of an aqueous electrolyte, wherein the inorganic powder comprises essentially sub-micron particles, preferably from about 5 to about 150 nm in size. The matrix of the present disclosure may, optionally, comprise between about 0.1% to about 25% of a non-volatile liquid lubricant that is chemically compatible with all the components in the matrix.

In accordance with a preferred embodiment of the present disclosure, the inorganic powder is characterized in that it has a surface area of at least 10 $m_2/g$, and possesses a good absorption capability for the aqueous electrolyte.

The PCM of the present disclosure has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the disclosure, where the matrix is in the preparation of a membrane, the inorganic powder comprised in the matrix is a very fine, electronically non-conductive powder having a particle size of preferably less than 150 nm. According to this embodiment, the PCM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the disclosure, an improvement of the matrix wettability and consequently the electrolyte retention, is achieved by adding to the membrane multi valance metal salts such as Al, Zr, B, Ti and the like.

According to another embodiment of the disclosure, the improvement of the matrix wettability and consequently the electrolyte retention is achieved by pre-treating the inorganic powder with an acid or a base prior to the preparation of the membrane.

This disclosure also relates to a process for producing a proton-conducting membrane (PCM), the process comprising: mixing (i) 5% to 60% by volume of an electrically non-conductive inorganic powder having a good acid absorption capacity, the powder comprising essentially nanosize particles; (ii) 5% to 50% by volume of a polymeric binder that is chemically compatible with acid, oxidizer and the fuel; and (iii) 10 to 90% by volume of an acid or aqueous acid solution, wherein the mixing is conducted at various rate steps, thereby producing a proton-conducting mixture; continuously casting the proton-conducting mixture on rolled paper, non-woven matrix or any other coatible material at ambient temperature; drying the casted proton-conducting mixture at a temperature of greater than 100° C. for approximately 5 to 60 minutes, thereby forming a dry film; laminating a plurality of the dry films together under pressure, and thereafter extracting pore-former out of pores of the dry films, thereby forming the proton-conducting membrane having an average pore size of less than 30 nanometers.

The PCM of the present disclosure comprises a nanosize ceramic powder with good acid adsorption capacity, a polymer binder, and an acid absorbed in nanosize pores. This PCM is particularly useful in regenerative fuel cell (RFC) applications.

The main components of the PCM are a polymeric binder, an inorganic nanosize powder, and an acidic solution or acid. The typical diameter of the PCM pores is about between 1.5 to 30 nm, preferably 3 nm. The pores are filled with free acid molecules, which is a major advantage for the application of energy storage system (e.g., RFC applications) that uses an acidic electrolyte.

The reagents (i.e., powders and solvents) are mixed with additives that improve the quality of the solution and results in better mechanical and physical properties of the cast film. The solution is then cast using a mechanical coater, which is a more efficient process and more homogeneous one.

Preferably, at least 2 to 6, preferably 4, of the dry films are laminated together. The various rate steps of the mixing step comprises: mixing for between 1 to 5 hours at a mixing rate of between about 100 to 500 rpm at room temperature; mixing for between 10 to 20 hours at a mixing rate of between about 400 to 700 rpm at a temperature in the range between about 30 to 50° C.; mixing for between 10 to 20 hours at a mixing rate of between about 100 to 400 rpm at room temperature; and degassing for between 5 to 30 minutes at a temperature in the range between about 30 to 50° C. The step of continuously casting the proton-conducting mixture is performed using a coater machine for solution application over the rolled paper, non-woven matrix or the like roll to roll carrier support.

The carrier support is a siliconized paper, and the rolling speed of the carrier support is set according to the specific gravity of the proton-conducting mixture.

The dry film has a thickness between about 40 to 60 micrometers, more preferably between about 50 to 55 micrometers.

Preferably, the step of laminating the dry films is performed at the pressure in the range between about 5 to 20 kg/cm$^2$ and at a temperature in the range between about 130 to 150° C. for between about 3 to 10 minutes.

The process further comprising adding at least one rheology control agent prior to mixing. The rheology control agent is at least one selected from the group consisting of: SPAN80 (generic chemical description sorbitan monooleate, $C_{24}H_{44}O_6$), and Zonyl® FSN (generic chemical description $(C_2H_4O)_x(CF_2)_yC_2H_5FO$, nonionic fluorosurfactant).

The extraction step comprises: (a) immersing the proton-conducting membrane with pore-former in an ether/ethanol mixture for a period of time sufficient to remove the pore-former from the pores of the proton-conducting membrane; (b) immersing the proton-conducting membrane from step (a) in ethanol to remove any residual pore-formers and other solvents; and (c) immersing the proton-conducting membrane in water to remove the ethanol from the pores.

The ether/ethanol mixture has a ratio of between about 1:9 to 3:7. The immersing step (a) takes place for between about 1 to 5 hours. The immersing step (b) takes place for between about 1 to 5 hours.

The polyfluoroaryl sulfonic acid is at least one selected from the group consisting of: polyfluorobenzene, polyfluorotoluene, and polyfluorostyrene sulfonic acid. The perfluoroaryl sulfonic acid is at least one selected from the group consisting of: perfluorobenzene, perfluorotoluene and perfluorostyrene sulfonic acid.

The process further comprising a pore-former selected from the group consisting of: DBP (i.e. dibutyl phthalate), diethyl phthalate, dimethylphthalate, propylene carbonate, ethylene carbonate and the like or any combinations thereof.

The process further comprising the step of recapturing the acid or aqueous acid solution.

The PCMs used in the fuel cells of this disclosure have good ionic conductivity, are not affected by heavy metals impurities, and can be used at temperatures even higher than 100° C. or lower than 0° C.

Nanoporous-proton conducting membranes (NP-PCM) employed in the MEAs of this disclosure allow water management which prevents porous electrodes from flooding. This makes such electrodes advantageous for use in the fuel cells of this disclosure.

In the MEA, the catalyst dispersed on the anode is capable of catalyzing hydrogen redox reactions—HERs and HORs. Further, the catalyst dispersed on the anode is capable of catalyzing HERs and HORs in the presence of a halogen ion or a mixture of halogen ions.

For the anode in the MEA of this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anode in the MEA of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports of this disclosure can have any number of possible porosities and/or void spaces associated therewith.

In the MEA, the catalyst dispersed on the cathode is capable of catalyzing halogen/halide redox reactions.

For the cathode in the MEA of this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Pt/Ir, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathode in the MEA of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports of this disclosure can have any number of possible porosities and/or void spaces associated therewith.

The catalyst compositions useful in the MEAs of this disclosure include at least one precious metal. The catalyst compositions are capable of catalyzing a charging reaction and a discharging reaction in a regenerative fuel cell, e.g., a hydrogen/bromine regenerative fuel cell. The catalyst compositions are also capable of catalyzing hydrogen redox reactions and halogen/halide redox reactions. Further, the catalyst compositions are capable of catalyzing hydrogen evolution reactions (HERs) and hydrogen oxidation reactions (HORs). Particularly, the catalyst compositions are capable of catalyzing HERs and HORs in harsh environments, e.g., in the presence of a halogen ion or a mixture of halogen ions.

The catalyst compositions useful in the MEAs of this disclosure can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst compositions include PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst compositions useful in this disclosure include those where the at least one precious metal is supported on carbon powder or ceramic powder.

The catalyst compositions useful in the MEAs of this disclosure include precious metals, precious metal alloys (e.g., precious metals alloyed with other precious metals, transition metals and/or other elements), or precious metal mixtures (e.g., precious metals mixed with other precious metals, transition metals and/or other elements). The catalysts have been found to be more active towards HOR and HER reactions and more stable in tri-bromide solutions than state-of-the art Pt catalysts. The catalysts can be used for HOR in proton exchange membrane fuel cells (PEMFCs).

The catalyst compositions can be made by conventional procedures known in the art. The catalysts in the Examples below were synthesized and characterized by physical characterization methods and their activity is tested electrochemically. The catalysts can be supported on carbon or ceramic powder. The catalyst compositions can be synthesized, for example, by electroless deposition or by polyol method. The catalyst compositions of this disclosure having a core-shell structure (or a skin structure) can be prepared by conventional procedures known in the art.

The unsupported catalysts of this disclosure have grain sizes typically in the range of from about 2 to about 8 nm, excluding Pd containing catalysts which grain size is in the range of from about 26 to about 53 nm. The supported catalysts of this disclosure have grain sizes typically in the range of from about 2 to about 7 nm. Most of the Pt and Ir containing catalysts comprise a skin-type structure, having an outer-shell rich in platinum, iridium and their alloys. In an embodiment, this disclosure includes skin-type catalysts. Skin-type catalysts were found to be highly active and stable in HER and HOR reactions in HTBFCs, tested in-situ and ex-situ. The durability of the catalysts of this disclosure, including sub monolayer ones, atom islands, and one or more monolayers of Pt and Ir and their alloys, with or without other elements, were found to be very good. Many thousands of charge—discharge (HOR/HER) cycles were achieved utilizing the catalysts of this disclosure in a hydrogen/bromine regenerative fuel cell.

In particular, for the catalyst compositions of this disclosure comprising a core-shell structure (or a skin structure), the core (or particle) preferably contains a low concentration of Pt or a Pt alloy. The Pt alloy can include one or more other precious metals, e.g., Ru, Re, Pd and Ir, and optionally one or more transition metals, e.g., Mo, Co and Cr. The core may also comprise a Pt-free metal or alloy. The Pt-free metal can include one or more precious metals, e.g., Ru, Re, Pd and Ir. The Pt-free alloy can include two or more precious metals, e.g., Ru, Re, Pd and Ir, and optionally one or more transition metals, e.g., Mo, Co and Cr. The shell (or skin) preferably comprises a sub-monolayer, or atom islands, to one or more layers of a precious metal, e.g., Pt or Ir, and alloys thereof. The Pt and Ir alloys can include one or more other precious metals, e.g., Ru, Re, and Pd, and optionally one or more transition metals, e.g., Mo, Co and Cr. The one or more other precious metals, e.g., Ru, Re, and Pd, are preferably present in the Pt and Ir alloys in a minor amount. Likewise, the one or more transition metals, e.g., Mo, Co and Cr, are preferably present in the Pt and Ir alloys in a minor amount. The catalyst compositions of this disclosure are capable of catalyzing, in the presence of a halogen ion or a mixture of halogen ions, a charging reaction and a discharging reaction in a regenerative fuel cell.

Carbon powder can also be a suitable catalyst for use in this disclosure. For bromide/tribromine redox reaction in the solution electrode, it has been found that carbon powder itself is an effective catalyst for the processes, reduction and oxidation. In another embodiment, the solution electrode may be used without any metallic catalyst.

This disclosure provides electrodes that are useful in the operation of fuel cells. The electrodes of this disclosure include anodes and cathodes that each include a support and a catalyst dispersed thereon. The electrodes can be made by processes described herein or by conventional procedures known in the art.

The catalysts dispersed on the electrodes are commonly nano particles (preferably 2-5 nm) of Pt, Ir, Pt alloys, and Ir with or without other elements. However, in order to save the cost of expensive noble metals, it is possible to use non-noble metal based alloys such as for example Ni, Fe, Co, Ir, or Ru as the core and coat them with the required noble metal catalyst by common electrochemical or chemical processes. The thickness of such catalyst layer may be between less than one monolayer to 10 monolayers.

Electrodes according to this disclosure are porous, and are made by processes designed to control their porosity and hydrophobicity. For example, the electrodes can be fabricated by coating a carbon support (for example, a commercially available carbon cloth or paper) with a suspension comprising carbon powder, a polymeric binder, and in some cases a pore-former. The suspension can optionally comprise powder of metallic catalyst. For solution electrodes, a metallic catalyst is optional, whereas for hydrogen electrodes, a metallic catalyst is required. The suspension (with or without catalyst) is referred herein as "ink". The suspension is mixed for several hours, applied to the carbon support, solidified, optionally by drying and heating, and then washed, for example, with solvents and/or water to remove the pore former, leaving pores behind. The resulting layer is called a microporous layer or a diffused layer and, in the gas side, it is called a gas diffused layer (GDL). Electrodes used with rechargeable fuel cells in accordance with this disclosure have a porosity of between about 30% and about 80% (vol/vol). Preferably, a porosity of between about 40% and about 80% (vol/vol) provides convenient and efficient electrodes.

In an embodiment, the fuel cell uses the same electrodes for charging and for discharging modes. In such an embodiment, the fuel cell typically has a solution compartment, a hydrogen compartment, and a membrane electrode assembly connecting between them. The electrodes can be used in different types of fuel cells, and preferably are used in regenerative fuel cells, e.g., hydrogen/bromine regenerative fuel cells.

The porous electrode can comprise a gas diffusion layer, characterized by the reactant or/and the product being a gas ($H_2$ in the case of HTBFC) and catalytic layer, having a highly dispersed catalytic powder mixed with polymeric binder, e.g., PVDF (polyvinylidene fluoride) and PTFE (polytetrafluoroethylene) ionomer such as Nafion™ polymer. The reaction can take place at the three-phase zone, where gas and liquid electrolyte react on a solid catalyst surface.

The anodes and cathodes of this disclosure can comprise a catalyst layer and a porous backing layer. A preferred catalyst used at the anode is, for example, nano sized Pt—Ir alloy powder. A preferred catalyst used at the cathode is, for example, the same nano sized Pt—Ir alloy powder as used at the anode. The core-shell structure (or a skin structure) catalysts include sub-monolayers, atom islands, and one or more layers of a precious metal, e.g., Pt or Ir, and alloys thereof, with or without other elements. In such alloys used in the core-shell structure (or a skin structure) catalysts, the ratio between platinum or iridium and the metal (Pt:M or Ir:M atomic ratio) is between about 1:10 to about 10:1.

The backing layer is preferably made of carbon. This backing layer is porous and is used for support and at the same time for making electrical contact between the housing and the catalyst powder, which by itself is connected to the membrane.

As a result of long operation, the bond between the catalyst particles and the supporting carbon matrix is lost, leading to the degradation of the fuel cell. In view of that it is proposed in this disclosure to bind the nano size catalyst to a nano size ceramic powder and subsequently bind the obtained particles to the carbon backing layer and to the PCM. A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size and structure of the catalyst particles. For the anode it is preferred to form either a Pt—Ru or Pt—Ir alloy catalyst layer or to form two consecutive layers of either Pt on Ru or Pt on Ir with atomic ratio of 1:10 to 10:1. Other elements, like Sn, Mo, or Ni can be added to the catalyst layer to further improve reaction kinetics. Catalyst layers for the anode and cathode can be the same or different.

The anode can comprise a carbon support layer, optionally a gas diffusion layer, and a catalytic layer. The catalytic layer can be coated onto the carbon support layer. The gas diffusion layer can be coated onto the carbon support layer and the catalytic layer can be coated onto the gas diffusion layer. The catalytic layer can also be coated onto the solid electrolyte membrane or proton conducting membrane.

The cathode can comprise a carbon support layer, optionally a microporous layer, and optionally a catalytic layer. The catalytic layer can be coated onto the carbon support layer. The microporous layer can be coated onto the carbon support layer and the catalytic layer can be coated onto the microporous layer. The catalytic layer can also be coated onto the solid electrolyte membrane or proton conducting membrane.

In the regenerative fuel cell, the catalyst dispersed on the anode and the catalyst dispersed on the cathode are capable of catalyzing hydrogen redox reactions and halogen/halide redox reactions. Also, in the regenerative fuel cell, the catalyst dispersed on the anode and the catalyst dispersed on the cathode are capable of catalyzing a charging reaction and a discharging reaction in the regenerative fuel cell in the presence of a halogen ion or a mixture of halogen ions.

Other catalyst compositions and supports known in the art may also be used in the MEAs of this disclosure.

Generally, single cells are combined into a fuel cell stack to produce the desired level of electrical power.

A hydrogen/bromine (tribromide) regenerative electrochemical cell is well suited for energy storage applications such as peak shaving, load management and other emerging distributed utility applications. A regenerative hydrogen/bromine cell facilitates electrical energy storage by consuming electricity in electrolyzing hydrogen bromide into hydrogen and tribromide and some bromine reactants as stored chemical energy. The hydrogen and tribromide are later reacted electrochemically in the cell to produce electrical energy. Hence, the cell is regenerative (reversible), in that it can efficiently operate as an electrolysis cell producing reactants and consuming electricity or a fuel cell consuming reactants and producing electricity. The cell exchanges electrical and chemical energy.

The hydrogen/tribromide regenerative electrochemical cell offers several advantages, for example, the hydrogen and bromine electrodes are fully reversible allowing very high electric-to-electric efficiencies. The same electrodes can be used as electrocatalysts for both chemical and electricity generation and therefore, the same cell can be used for both functions. The cell is capable of operating at a high current and high power density in both charging and discharging modes, resulting in lower capital costs. The reactants for chemical and electricity generation are stored separately from the cell which makes it cost effective for both peaking and load leveling (e.g., weekly cycle) and low cost capacity (kWh) increases.

The electrochemical reactions for the hydrogen/tribromide cycle take place in a charge mode and a discharge mode. During charge, hydrogen bromide is electrolyzed into hydrogen and tribromide (with minor amounts of bromine). These fluids are then stored separately outside the electrochemical cell. Since all reactants are stored external from the cell, independent sizing for power and energy storage becomes a distinct advantage. During discharge, the hydrogen and tribromide solution are delivered to the cell, where they react electrochemically to produce electric power and hydrogen bromide.

During charge (electrolysis), concentrated hydrobromic acid is electrolyzed and tribromide is formed at the positive electrode. Hydrated protons are transported across the membrane, and hydrogen gas is formed at the negative electrode. The hydrogen and tribromide that are formed during the charge mode are stored external to the cell, and they are fed back to the cell during the discharge (fuel cell) mode to produce electrical energy.

The quantity of tribromide species and minor amount of soluble free bromine available in the solution establishes the discharge capacity of the positive electrode in a hydrogen/tribromide fuel cell. A large mass of tribromide is ordinarily desirable in order to maximize the overall fuel cell capacity.

The fuels useful in the fuel cells of this disclosure are conventional materials and include, for example, hydrogen and alcohols. The oxidants useful in the fuel cells of this disclosure are conventional materials and include, for example, oxygen, bromine, chlorine and chlorine dioxide.

Further objects, features and advantages of the present disclosure will be understood by reference to the following drawings and detailed description.

Various modifications and variations of this disclosure will be obvious to a worker skilled in the art and it is to be understood that such modifications and variations are to be included within the purview of this application and the spirit and scope of the claims.

EXAMPLES

Referring to FIGS. 2 and 3, tests were performed in a 7 square centimeter cell to compare an effect of the flow pattern type of BPP plates 30 on the efficiency and flow rate of liquid media. In the first experiment, two cells operated in parallel, with the same flow rate. A cell with an interdigitate flow field pattern on a liquid side had 79% round trip efficiency, and a cell with serpentine flow field pattern on a liquid side had 73% efficiency. In the second experiment, a 7 square centimeter cell was built with interdigitate flow field pattern. The performance of the cell was measured versus the flow rate of the liquid media. In this test, the flow rate (stoichiometric equivalent) was reduced from 17 to 9 (i.e. by almost 50%) and an energy efficiency of the cell that resulted from the flow rate reduction was reduced by 3%. These experiments suggest a benefit of using the interdigitate flow field pattern on the liquid media of each of BPP plates 30.

Using the interdigitate flow field pattern on the liquid side of each of BPP plates 30 reduced the required flow rate of the fluid reactant by 10-50% compared to other patterns. A pressure loss across channel 40 of each of BPP plates or flow field is a major factor for designing, and should be as low as possible to reduce cost of circulation of fluid or reactant. For the hydrogen side, a pressure loss across the serpentine flow field pattern is very low, with less than 10 millibar (mbar) operation range, and optimum of 5 mbar. For the liquid flowing in the interdigitate flow field pattern, a working range of 50-500 mbar was tested, with preferred 100-200 mbar pressure difference and optimum pressure loss of 100-150 mbar was used.

Figure 4:
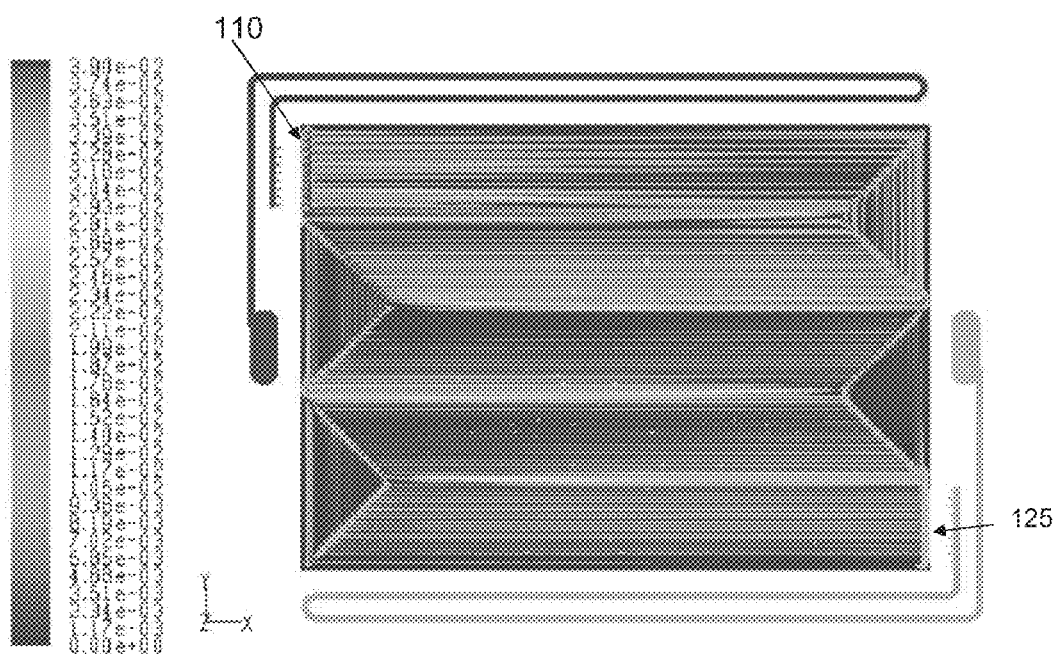
FIG. 4 illustrates a simulation result for liquid flow in a serpentine flow pattern.
Figure 5:
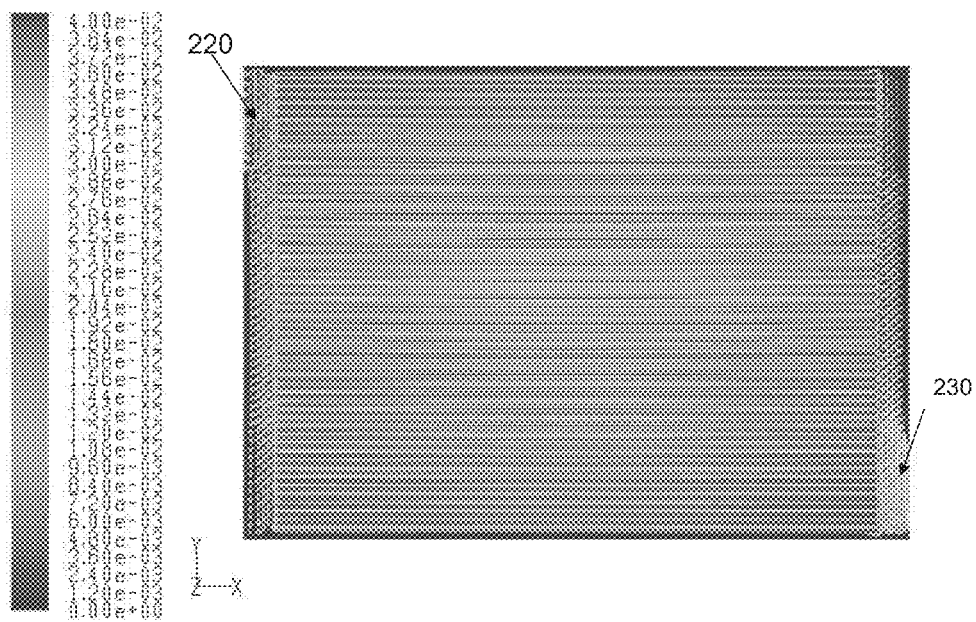
FIG. 5 illustrates a simulation result for liquid flow in an interdigitate flow pattern.

Referring to FIGS. 4 and 5, to calculate an effect of flow field pattern in the liquid side of a fuel cell stack assembly, a simulation test was performed, and the results are shown in FIGS. 4 and 5. In FIG. 4, inlet port 110 and outlet port 125 of a serpentine flow field pattern are shown. In FIG. 5, inlet port 210 of the flow field, and the outlet port 230 of an interdigitate flow field pattern are marked. The colors legend is the mass fraction of the active component that reacts in the fuel cell. In both FIGS. 4 and 5, the initial concentration and the flow rates are equal.

It appears that for the serpentine flow pattern in FIG. 4, the flow distribution of active component is not homogenous and the overall concentration of active component is low (blue color), with small part of the BPP plate having higher concentration of active component and in larger parts there is low concentration of active component. This result indicates that the fuel cell stack assembly of FIG. 4 will generally work with low concentration of active component, and this will end in lower voltage efficiency. The concentration distribution in the interdigitate flow field pattern of FIG. 5 is very good. The concentration of active component is high and equal across the entire BPP plate of FIG. 5. The enhanced distribution of active component in the interdigitate flow pattern of FIG. 5 will lead to better voltage efficiency and required lower flow rate than the serpentine flow field of FIG. 4.

Referring to FIGS. 1 and 6-8, an effect of SCSC 315 was measured in a 10 cells stack in a fuel cell stack assembly similar to fuel cell stack assembly 5, 100 Watt power rated unit. A current density was first measured without SCSC 315, and noted to be 25 percent. In a second experiment, SCSC 315 were embedded inside BPP plates 30 in insulated fluid distribution manifold 25. This change increases the current efficiency to 50 percent, which is an increase of 100 percent in efficiency. In further experiment, 13 cells stack in a fuel cell stack assembly similar to fuel cell stack assembly 5, 1.1 kiloWatt unit, embedded with SCSC 315 embedded inside BPP plates 30 in insulated fluid distribution manifold 25, was operated with current efficiency of 97 percent, which is almost three times increase of current efficiency with reference to the first experiment.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A frame for a bipolar plate, said frame comprising:
   a frame main body formed of an insulation material, said frame main body having a first surface and a second surface opposite the first surface; said frame main body having an aperture therethrough; and
   connection channels that are formed in the frame main body to connect to reaction flow channels in the bipolar plate;
   wherein the bipolar plate comprises:
   a plate main body formed of an electrically conductive material, said plate main body having a first surface and a second surface opposite the first surface, each surface having reaction flow channels through which fluids pass;
   manifolds formed on the plate main body in the form of an inlet to introduce a fluid to the reaction flow channels and an outlet to discharge the fluid from the reaction flow channels;
   connection channels that are formed on the plate main body to connect the reaction flow channels and the manifolds, wherein said connection channels have a length from the reaction flow channels to the manifolds and a cross section area sufficient to form an internal ionic solution resistor that reduces a shunt current; wherein the length and the cross section area of the connection channels are determined by a potential across the manifolds, conductivity of ionic solutions that pass through the connection channels, and maximum allowed shunt currents;
   said reaction flow channels on the first surface having a plurality of ribs therebetween forming an interdigitate flow field pattern, and
   said reaction flow channels on the second surface having a plurality of ribs therebetween forming an interdigitate flow field pattern or a flow field pattern different from an interdigitate flow field pattern.

2. The frame of claim 1 wherein said bipolar plate is positioned in said aperture; said bipolar plate connected to said frame through the connection channels formed in the frame main body and reaction flow channels in the bipolar plate.

3. The frame of claim 1 wherein the connection channels formed in the frame main body are connected to manifolds.

4. The frame of claim 1 wherein the bipolar plate further comprises reaction flow channels on the second surface have a plurality of ribs therebetween forming a serpentine flow field pattern.

5. The frame of claim 1 wherein the bipolar plate further comprises connection channels that are formed on the plate main body to connect the reaction flow channels and the manifolds, and to which gaskets for sealing the bipolar plates are attached; wherein the connection channels are formed such that flat regions of both the first surface and a second surface opposite the first surface of the plate main body face each other, and the gaskets are attached to the flat surfaces of the plate main bodies.

6. The frame of claim 1 wherein the frame and the bipolar plate are sealed by over molding.

7. A frame for a bipolar plate in which the bipolar plate is at least one of a plurality of bipolar plates in a regenerative fuel cell stack;

wherein the frame comprises:
a frame main body formed of an insulation material, said frame main body having a first surface and a second surface opposite the first surface; said frame main body having an aperture therethrough; and
connection channels that are formed in the frame main body to connect to reaction flow channels in the bipolar plate; and wherein the bipolar plate comprises:
a plate main body formed of an electrically conductive material, said plate main body having a first surface and a second surface opposite the first surface, each surface having reaction flow channels through which fluids pass;
manifolds formed on the plate main body in the form of an inlet to introduce a fluid to the reaction flow channels and an outlet to discharge the fluid from the reaction flow channels;
connection channels that are formed on the plate main body to connect the reaction flow channels and the manifolds, wherein said connection channels have a length from the reaction flow channels to the manifolds and a cross section area sufficient to form an internal ionic solution resistor that reduces a shunt current; wherein the length and the cross section area of the connection channels are determined by a potential across the manifolds, conductivity of ionic solutions that pass through the connection channels, and maximum allowed shunt currents;
said reaction flow channels on the first surface having a plurality of ribs therebetween forming an interdigitate flow field pattern, and
said reaction flow channels on the second surface having a plurality of ribs therebetween forming an interdigitate flow field pattern or a flow field pattern different from an interdigitate flow field pattern.

8. The frame of claim 7 wherein the regenerative fuel cell stack comprises:
a plurality of said bipolar plates;
a plurality of membrane and electrode assemblies comprising:
an anode, a cathode and a nanoporous proton conducting membrane disposed between said anode and said cathode; said anode comprising a support and a catalyst dispersed thereon, said catalyst comprising at least one precious metal; said cathode comprising a support and a catalyst optionally dispersed thereon, said catalyst comprising carbon powder or at least one precious metal with carbon powder; wherein the catalyst dispersed on said anode and the catalyst dispersed on said cathode are the same or different and are capable of catalyzing, in the presence of a halogen ion or a mixture of halogen ions, a charging reaction and a discharging reaction in a regenerative fuel cell;
wherein said nanoporous proton conducting membrane comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution; and
wherein the plurality of membrane and electrode assemblies are alternately stacked with the plurality of said bipolar plates.

9. The frame of claim 7 wherein the length and the cross section area of the connection channels are determined by a potential across the manifolds, conductivity of ionic solutions that pass through the connection channels, and maximum allowed shunt currents.

* * * * *